United States Patent

Matsushita et al.

[11] Patent Number: 5,161,809
[45] Date of Patent: Nov. 10, 1992

[54] METAL GASKET

[75] Inventors: Yoshitaka Matsushita; Yuji Takahashi; Hideaki Harada, all of Urawa, Japan

[73] Assignee: Nippon Leakless Industry Co., Ltd., Tokyo, Japan

[21] Appl. No.: 721,086

[22] Filed: Jun. 25, 1991

[30] Foreign Application Priority Data

Jul. 16, 1990 [JP] Japan .................. 2-185391

[51] Int. Cl.$^5$ .............................. F16J 15/08
[52] U.S. Cl. .................. 277/235 B; 277/231; 277/234; 277/236
[58] Field of Search ............. 277/235 B, 231, 232, 277/236, 235 R, 233, 234

[56] References Cited

U.S. PATENT DOCUMENTS

| 4,335,890 | 6/1982 | Nicholson | 277/235 B |
| 4,468,044 | 8/1984 | Ulmer et al. | 277/166 X |
| 4,759,585 | 7/1988 | Udagawa | 277/235 B |
| 4,767,124 | 8/1988 | Udagawa | 277/235 B |
| 4,776,073 | 10/1988 | Udagawa | 277/235 B X |

FOREIGN PATENT DOCUMENTS

| 0113968 | 5/1987 | Japan | 277/235 B |
| 0177363 | 8/1987 | Japan | 277/235 B |
| 0186950 | 8/1988 | Japan | 277/235 B |
| 0210464 | 9/1988 | Japan | 277/235 B |
| 0073156 | 3/1989 | Japan | 277/235 B |
| 0077740 | 5/1989 | Japan | 277/235 B |
| 0182563 | 7/1989 | Japan | 277/235 B |
| 1260236 | 1/1972 | United Kingdom | 277/235 B |
| 1549200 | 7/1979 | United Kingdom | 277/235 B |

Primary Examiner—Thomas B. Will
Assistant Examiner—James K. Folker
Attorney, Agent, or Firm—Young & Thompson

[57] ABSTRACT

A metal gasket includes plural functional layers formed with embossments along peripheral edges of cylinder openings thereof and a backup plate not formed with any embossment and sandwiched between the functional layers. At least one edge plate is provided which is spaced radially within and is coplanar with peripheral edges of cylinder openings of the backup plate. The edge plate is different in thickness from, generally thinner than, the backup plate. Grommets are provided to fasten together the edge plate and portions of the functional layers overlapping the edge plate. With this arrangement, by selecting thicknesses of the edge plate and the backup plate so as to be different between them by a requisite value, surface pressure at peripheral edges of cylinder openings of the metal gasket can be set a desired value. Therefore, this metal gasket is superior in sealing performance and uniformity.

5 Claims, 5 Drawing Sheets

FIG.2 _PRIOR ART_
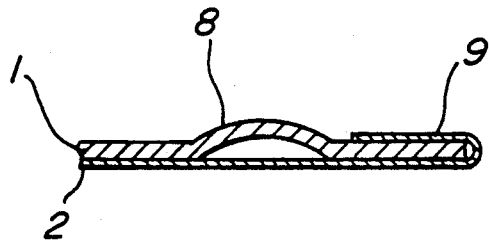
FIG.3 _PRIOR ART_
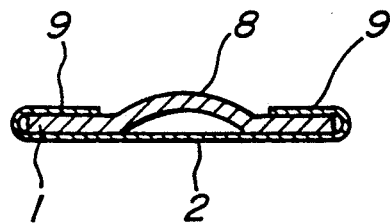

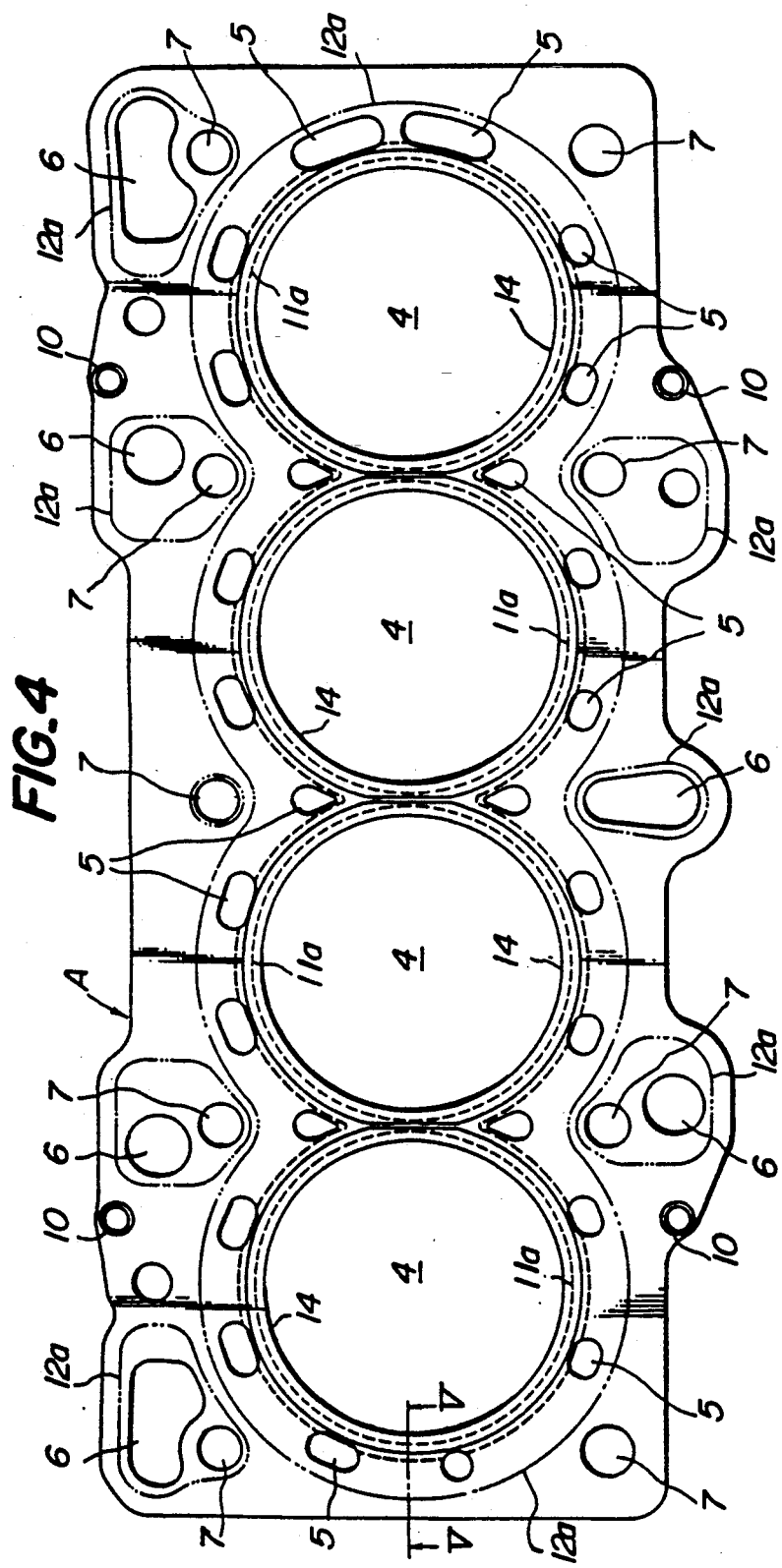
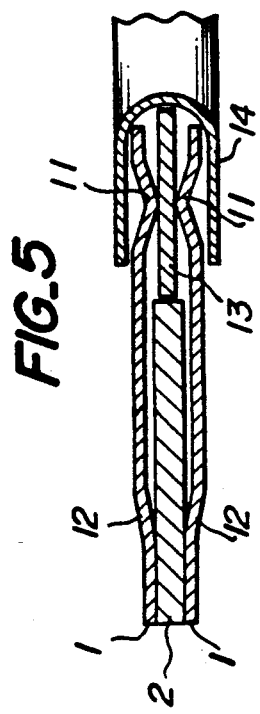
FIG. 4
FIG. 5

METAL GASKET

BACKGROUND OF THE INVENTION

This invention relates to a metal gasket to be interposed between a cylinder block and a cylinder head of an internal combustion engine.

Such a metal gasket is known as shown in FIGS. 1 to 3 illustrating a conventional metal gasket 3 as an example. As shown in partial sectional views, FIGS. 2 and 3, the metal gasket 3 includes a metal functional layer 1 made of a stainless steel or the like and a backup metal plate 2 made of a stainless steel or the like. The backup metal plate 2 is laminated on the metal functional layer and folded over the metal functional layer.

The metal gasket 3 is generally formed with cylinder openings 4, coolant openings 5, lubricant openings 6 and bolt holes 7.

The metal functional layer 1 has a embossment 8 formed along the peripheral edge of each of the cylinder openings 4 and a fold-over tab 9 is formed by folding the inner periphery of the cylinder opening 4 of the backup metal plate 2 over the peripheral edge of the cylinder opening 4 of the metal functional layer 1 to fasten the peripheral edge therebetween. Thus, the fold-over is made after assembling the metal functional layer 1 and the backup metal plate 2 as shown in FIGS. 2 and 3. FIGS. 2 and 3 illustrate sections of the metal gasket 3 taken along lines II—II and III—III in FIG. 1 on an enlarged scale, respectively.

In a metal gasket to be interposed between a cylinder block and a cylinder head of an internal combustion engine, sealing at peripheral edges of cylinder openings 4 is particularly important. Therefore, the metal gasket 3 shown in FIG. 1 includes annular embossments 8 formed at the peripheral edges of the cylinder openings 4 and the fold-over tabs 9 formed by folding the inner peripheries of the openings 4 of the backup metal plate 2 for ensuring the sealing about the cylinder openings 4.

In this case, the seal is enhanced by the elasticity of raised portions of the embossments 8 and by increased thicknesses of the fold-over tabs 9 causing clamping pressure to increase. However, since the fold-over tabs 9 are formed by plastic deformation of the metal plate, there is a tendency of the fold-over tabs to be uneven in thickness and at the same time there is a risk of cracks occurring in the fold-over tabs. Therefore, it is difficult to exactly control surface pressure distribution only by the fold-over tabs.

SUMMARY OF THE INVENTION

It is an object of the invention to provide an improved metal gasket which eliminates the disadvantage of the prior art and is able to set surface pressure at the peripheries of the openings of the metal gasket at an optimum value.

In order to accomplish this object, in a metal gasket including plural functional layers formed with embossments along peripheral edges of cylinder openings thereof and a backup plate not formed with any embossment and sandwiched between the functional layers, according to the invention at least one edge plate is provided in replacement of what would otherwise be each of the edge zones of the backup plate, these edge plates having certain widths and being positioned along the peripheral edges of the cylinder openings of the backup plate and separated from the backup plate, the edge plates having a thickness different from that of the backup plate, and grommets that fasten together the peripheral edges of the functional layers about the cylinder openings, respectively.

As mentioned above, according to the present invention, in a metal gasket including a backup metal plate sandwiched between two metal functional layers, an edge plate separated from the backup metal plate and having a thickness different from that of the backup metal plate is arranged in replacement of what would otherwise be the edge zones of the backup plate, these edge plates having suitable widths along the peripheral edges of the cylinder openings of the backup plate, and grommets to fasten together the peripheral edges of the functional layers about the cylinder openings of the metal gasket according to the invention. Accordingly, when the edge plate at the peripheral edge of the cylinder opening has a thickness of requisite value less than the remaining portion of the backup plate, a resultant thickness of the edge plate, portions of the functional layers overlapping thereat and the grommets become an optimum value, whereby the surface pressure at the peripheral edges of the cylinder openings of the metal gasket can be set at an optimum value.

In other words, according to the invention a metal gasket can be very easily designed to obtain desired surface pressure at peripheral edges of the cylinder openings of the metal gasket.

The invention will be more fully understood by referring to the following detailed specification and claims taken in connection with the appended drawings.

BRIEF DESCRIPTION OF THE DRAWINGS

FIG. 2 is an enlarged partial sectional view taken along a line II—II in FIG. 1;

FIG. 3 is an enlarged partial sectional view taken along a line III—III in FIG. 1;

FIG. 4 is a plan view of a metal gasket according to the invention;

FIG. 5 is an enlarged partial sectional view taken along a line V—V in FIG. 4;

DESCRIPTION OF THE PREFERRED EMBODIMENTS

Figure 1:
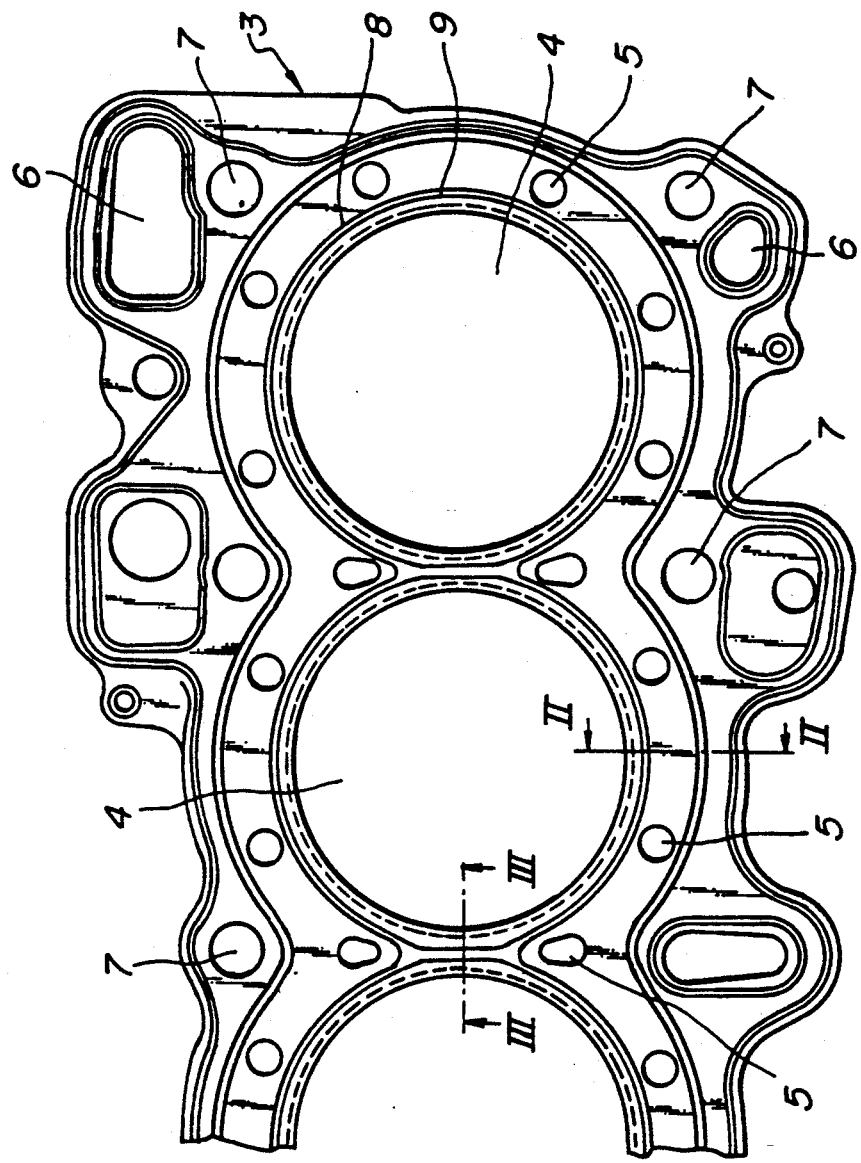
FIG. 1 is a partial plan view illustrating one example of metal gaskets of the prior art.

FIGS. 4–7 illustrate one embodiment of the invention wherein like components are designated by the same reference numerals as those in FIGS. 1–3. A metal gasket A according to the invention comprises metal functional layers 1 made of a stainless steel or the like and a backup metal plate 2 made of a stainless steel or the like. The backup metal plate 2 and the metal functional layers 1 on both sides are fastened together to form the metal gasket A.

The metal gasket A is formed with cylinder openings 4, coolant openings 5, lubricant openings 6, bolt holes 7 and riveted portions 10 for fastening the plural functional layers 1 to the backup metal plate 2.

Figure 6:
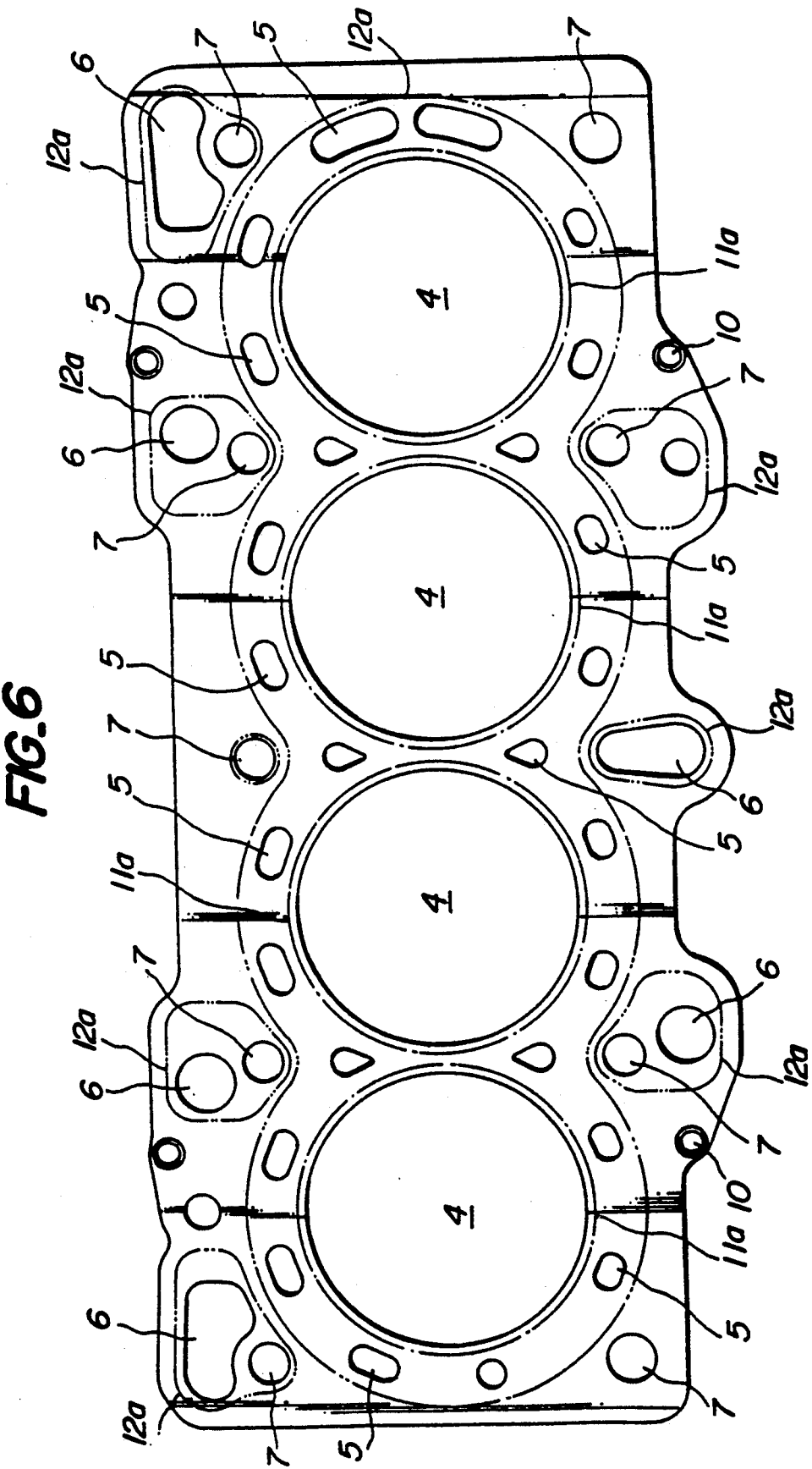
FIG. 6 is a plan view of a functional layer of the metal gasket shown in FIG. 4.
Figure 7:
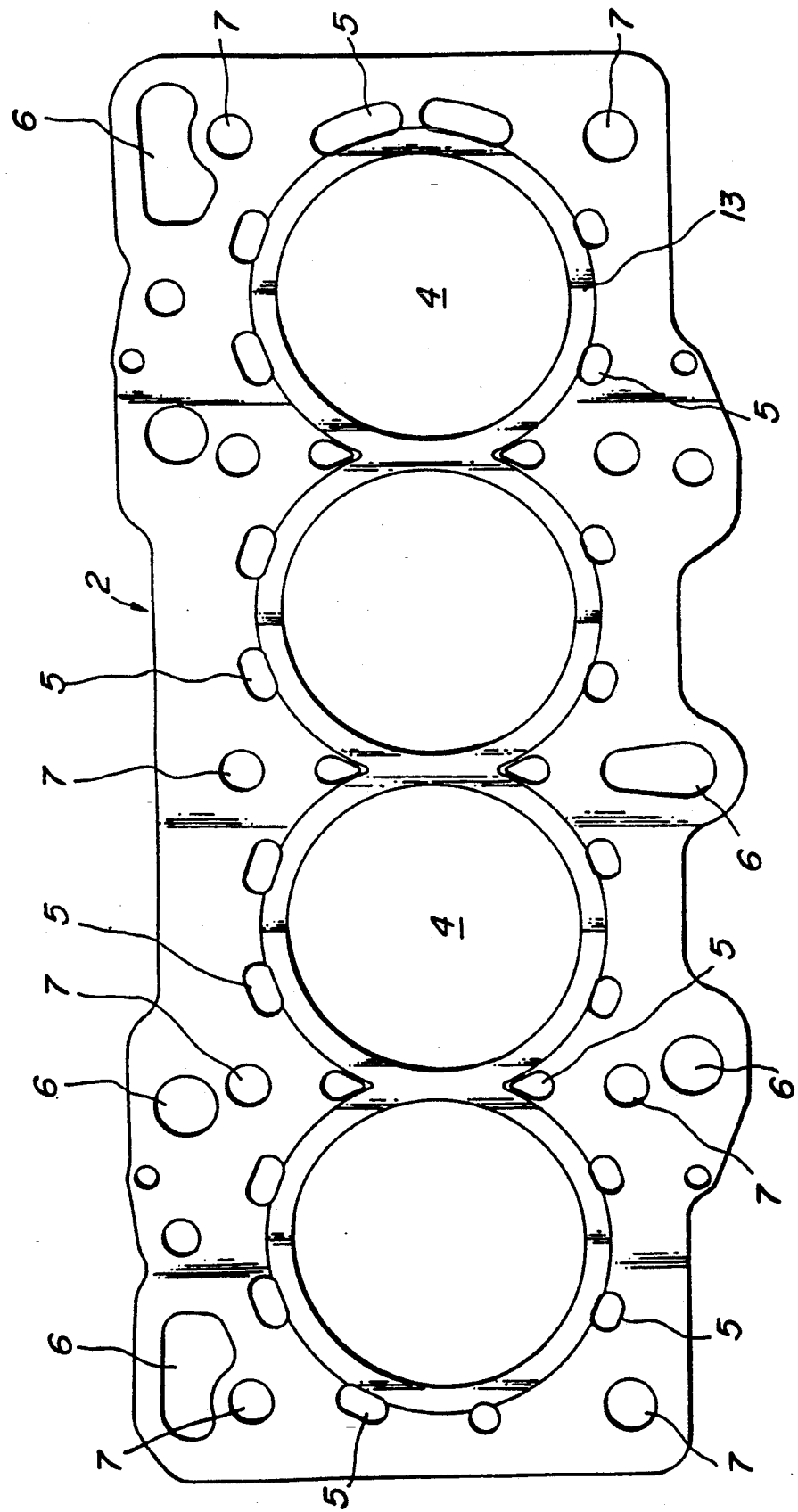
FIG. 7 is a plan view of a backup plate of the metal gasket shown in FIG. 4.

Each of the metal functional layers 1 is formed along peripheral edges of the cylinder openings 4 with roof-shaped full embossments 11 in section (FIG. 5) whose full embossment lines indicating their top edges are shown in dotted lines 11a in FIG. 4 and dot-and-dash lines 11a in FIG. 6. Moreover, each of the metal functional layers 1 is formed with slightly tapered half embossments 12 (FIG. 5) outwardly surrounding and separate from the full embossments 11, respectively. Half embossment lines of the half embossments 12 are shown in two-dot-and-dash lines 12a in FIGS. 4 and 6.

The metal gasket includes the backup metal plate 2 sandwiched between two metal functional layers 1 having full embossments 11 formed along the peripheral edges of the cylinder openings 4. The metal gasket is particularly formed according to this embodiment in the following manner. An edge plate 13 (FIGS. 5 and 7) having an appropriate width is provided along peripheral edges of the cylinder openings 4 and is separated from the backup metal plate 2. The edge plate 13 is thinner than the backup metal plate 2 in this embodiment. Moreover, grommets 14 are provided to embrace together the edge plate 13 and portions of the two metal functional layers 1 overlapping the edge plate 13. As shown in FIG. 5, the grommets 14 in this embodiment are independent from either the functional layers 1 or the backup metal plate 2 and quite different from those of the prior art formed by fold-over tabs of a backup metal plate 2 as shown in FIG. 2. The edge plate 13 may be composed of a plurality of separate parts.

By virtue of selecting the thicknesses of the edge plate 13 and the backup metal plate 2 at desirable values, surface pressure throughout the metal gasket can be set at a desired value when the metal gasket is installed on an engine head.

As can be seen from the above explanation, in a metal gasket including a backup metal plate 2 sandwiched between two metal functional layers 1, the edge plate 13 of a suitable width along peripheral edges of cylinder openings 4 is separated from the backup metal plate 2, which is different in thickness from the edge plate 13, and grommets 14 are provided along peripheral edges of the cylinder openings of the metal gasket according to the invention. For example, the edge plate 13 at the peripheral edges of the cylinder openings 4 is made a requisite value thinner than the backup metal plate 2. As a result, a resultant thickness of the edge plate 13, portions of the metal functional layers 1 overlapping thereat and the grommets 14 become an optimum value so that the surface pressure at the peripheral edges of the cylinder openings of the metal gasket can be set at the optimum value.

In other words, the thicknesses of edge plate 13 and the backup metal plate 2 are so selected that the difference in thickness between them becomes a requisite value in order to obtain a desired surface pressure at peripheral edges of the cylinder openings of the metal gasket according to the invention. Therefore, the present invention makes easy the design of metal gaskets and can provide a metal gasket superior in sealing performance and uniformity.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A metal gasket including plural functional layers formed with embossments along peripheral edges of cylinder openings thereof and a backup plate not formed with any embossment and fastened between the functional layers, wherein at least one edge plate having a certain width is provided radially inwardly within and spaced from and coplanar with peripheral edges of cylinder openings of the backup plate, said edge plate being different in thickness from the backup plate, and grommets that fasten together the peripheral edges of the cylinder openings of the functional layers, said embossments of the functional layers being full embossments which are roof-shaped in section and underlie the grommet and compress therebetween the edge plate.

2. The metal gasket as set forth in claim 1, wherein said functional layers are formed with slightly tapered half embossments outwardly surrounding and separate from the full embossments.

3. The metal gasket as set forth in claim 1, wherein said grommets are provided to fasten together the edge plate and portions of the functional layers overlapping the edge plate.

4. The metal gasket as set forth in claim 1, wherein said edge plate is disposed between portions of said functional layers that extend radially inwardly of said cylinder openings beyond said backup plate.

5. A metal gasket including plural functional layers formed with embossments along peripheral edges of cylinder openings thereof and a backup plate not formed with any embossment and fastened between the functional layers, wherein at least one edge plate having a certain width is provided radially inwardly within and spaced from and coplanar with peripheral edges of cylinder openings of the backup plate, said edge plate being different in thickness from the backup plate, and grommets that fasten together the peripheral edges of the cylinder openings of the functional layers, the edge plate being thinner than the backup plate.

* * * * *